July 1, 1941.  R. V. TERRY  2,247,646
TERMINAL BLOCK
Filed May 10, 1940  2 Sheets-Sheet 1
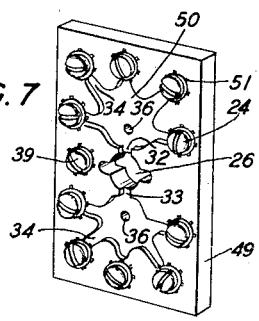
FIG. 1
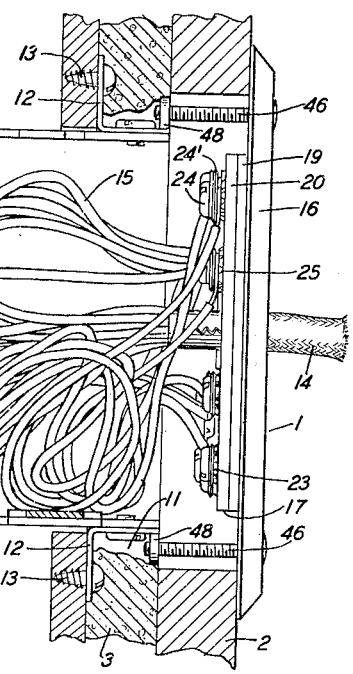
FIG. 2
FIG. 7
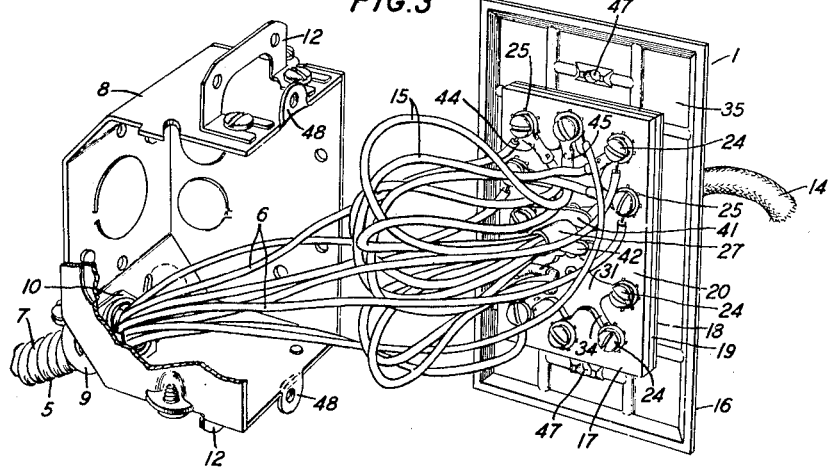
FIG. 3
INVENTOR
R.V. TERRY
BY
J. MacDonald
ATTORNEY July 1, 1941.  R. V. TERRY  2,247,646
TERMINAL BLOCK
Filed May 10, 1940  2 Sheets—Sheet 2
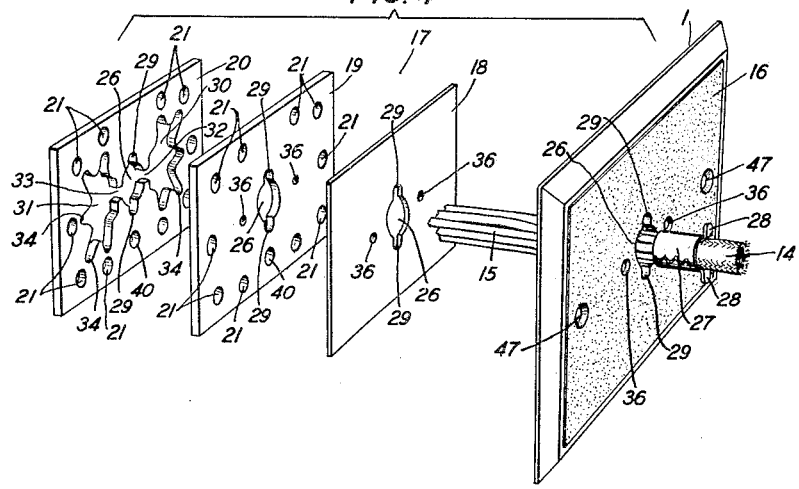
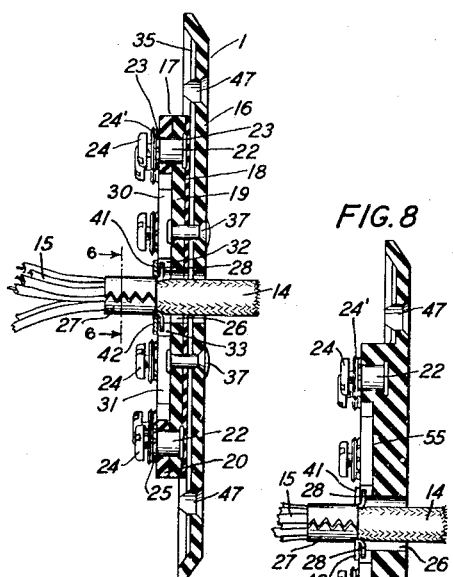
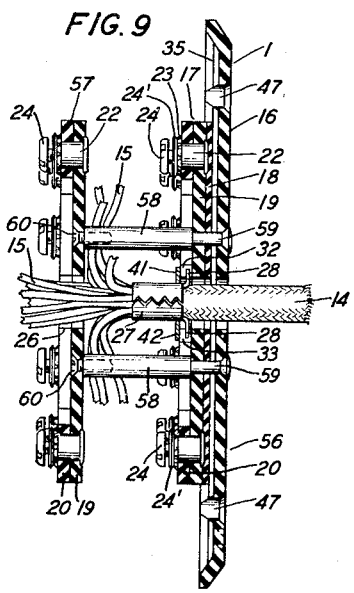
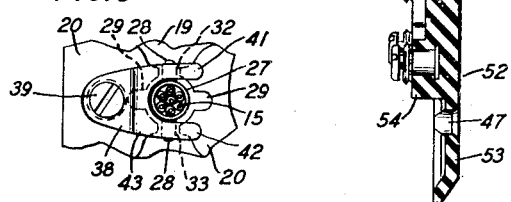
INVENTOR
R. V. TERRY
BY J. MacDonald
ATTORNEY Patented July 1, 1941

2,247,646

UNITED STATES PATENT OFFICE 2,247,646

TERMINAL BLOCK

Roy V. Terry, Montclair, N. J., assignor to Bell Telephone Laboratories, Incorporated, New York, N. Y., a corporation of New York Application May 10, 1940, Serial No. 334,327

2 Claims. (Cl. 174—59)

This invention relates to terminal blocks and more particularly to terminal blocks adapted to serve as a connecting means between a cable and a flexible cord conductor.

The object of the invention is to provide an improved terminal block adapted to serve as a connecting means between a cable entered into a receptacle in a wall and a cord conductor extending from the receptacle.

A feature of the invention resides in a terminal supporting slab structure.

Another feature resides in the combination of the slab with a face plate.

Another feature resides in means provided for anchoring the cord in place.

Other features reside in the particular forms and arrangements of the parts in combination.

In the drawings:

Fig. 1 shows an application of the invention, the terminal block in this case being located in the base-board of a room. Fig. 1 is drawn in reduced scale relative to other figures in the drawings;

Fig. 2 is a side view of the terminal block mounted on an outlet box located in a building wall structure and with wires of a cable and wires of a flexible conductor cord connected together on the terminal block;

Fig. 3 is a view in perspective and partly in section of the outlet box and terminal block shown in Fig. 2 and with the terminal block dismounted from the outlet box. Fig. 3 is drawn in reduced scale relative to Fig. 2;

Fig. 4 is a view in exploded form of portions of the terminal block and with a flexible conductor cord partly inserted in the structure. Fig. 4 is drawn to the same scale as Fig. 3;

Fig. 5 is a side view, partly in section, of the complete terminal block and the flexible conductor cord anchored therein;

Fig. 6 shows in detail a portion of the terminal block, a conductor cord and anchoring means holding the cord in place;

Fig. 7 is a modification of the invention and shows, in perspective, a one-piece slab of insulating material with terminals supported therein;

Fig. 8 is a side view, partly in section, of a modification of the structure shown in Fig. 5; and Fig. 9 is a side view, partly in section, of another modification of the invention.

In constructing office buildings, hotels, apartment houses and other buildings in which it is expected that a relatively large number of telephones will be required it is now becoming common practice to provide built-in telephone lines in the building. The built-in telephone lines comprise telephone wires run in either ducts or in cable form through the building wall structures to wall outlet boxes located in the wall structures of the various rooms of the building. Telephone substation instruments or local switchboards may then be connected as required to the built-in telephone lines by means of flexible telephone cords.

This invention provides a terminal block suitable for use as a connecting means between a built-in telephone line and a telephone cord. The terminal block 1 as shown in Fig. 1 may be located in the base-board 2 of a wall 3 and may serve as a connecting means between telephone apparatus 4 and a built-in telephone line 5 shown in Fig. 2. The built-in telephone line 5 shown in Fig. 2 comprises a plurality of telephone conductor wires 6 enclosed in a flexible protective sheath 7. An end portion of the sheath 7 is extended through a knock-out in an outlet box 8 and is anchored to the outlet box 8 by means of a bushing type clamp 9, the clamp 9 being of conventional form and having lock nuts 10—10 to hold the clamp 9 in place in the wall of the outlet box 8. The outlet box 8 is located in a building wall 3 which has been apertured at 11 to accommodate the outlet box 8, the outlet box 8 being secured in place by means of conventional type brackets 12 and screws 13. The terminal block 1, the structure of which will be later described, is secured across the aperture in the building wall 3 and in line with the outlet box 8. A telephone cord 14 is extended through the terminal block 1 and into the outlet box 8. Insulated conductor wires 15 of the telephone cord 14 are loosely arranged within the outlet box 8 and are brought into electrical connection with the conductor wires 6 of the telephone line 5 on the rear face of the terminal block 1.

The terminal block 1 shown in Figs. 2 to 5 comprises an apertured face plate 16 and an apertured slab 17 of insulating material. The slab 17 is a laminated structure comprising three apertured slabs 18, 19 and 20. Spaced apertures 21 are provided in the slabs 19 and 20 to receive terminals 22 comprising internally threaded metal eyelets which are spun over on their opposite ends as shown at 23 to hold the terminals in place and to hold the slabs 19 and 20 together in flat face-to-face relation. The terminals 22 are equipped with terminal screws 24 and washers 24' by means of which wires 6 of the telephone line 5 and wires 15 of the telephone cord 14 may be held together in electrical connection on the terminal block 1. To prevent turning of the terminals 22 when the terminal screws 24 are turned therein one spun-over end of each terminal is provided with radially extending fingers 25 which dig into the surface of the slab when that end of the terminal is spun over.

The slabs 18, 19 and 20 and the face plate 16 are centrally apertured at 26 to permit passage of the telephone cord 14 and a winged ferrule 27 provided on the telephone cord 14 through the terminal block, the ferrule 27 being clamped about the telephone cord 14 and having two diametrically disposed wing portions 28. The apertures at 26 are provided with finger-like continuations 29 to accommodate the wings 28 of the ferrule 27, the apertures 26 being in the form of a double armed keyhole. The slab 20 has two relatively large apertures 30 and 31 located to the right and left of the aperture 26 and in connection with the aperture 26 through passageways 32 and 33, the passageways 32 and 33 being displaced about 90 degrees from the position of the finger-like continuations 29 of the aperture 26 and being of sufficient size and form to accommodate the wings 28—28 of the ferrule 27. The apertures 30 and 31 are extended in finger-like extensions 34 toward the apertures 21 and so that for each aperture 21 there is a finger-like extension of the apertures 30—31 extending toward and almost to the aperture 21. The apertures 30 and 31 are, therefore, hand-like in form, and form in effect right and left hand-like extensions of the aperture 26 in the slab 20. As above mentioned, the slabs 20 and 19 are clamped together in face-to-face relation by means of the terminals 22. The slab 18 is interposed between the slab 19 and the inner face 35 of the face plate 16 and serves as an insulating strip between spun-over end portions of the terminals 22 and the inner face 35 of the face plate 16. Spaced apertures 36 are provided in the face plate 16 and in the slabs 18 and 19 to receive rivets 37 or other fastening means suitable for securing the slab 17 to the face plate 16. The rivets 37 as shown in Fig. 5 extend through the face plate 16 and the slabs 18 and 19 and into the apertures 30—31 of the slab 20 and are upset or enlarged on their ends to hold the slab 17 securely to the face plate 16.

When the slab 17 comprising the slabs 18, 19 and 20 is secured to the face plate 16, the apertures 26 in the parts are all in register to permit passing of the telephone cord 14 and the ferrule 27 secured thereon through the terminal block structure, the wings 28—28 of the ferrule 27 being passed through the finger-like extensions 29 of the apertures 26. After the telephone cord 14 with the ferrule 27 has been thrust in succession through the face plate 16 and the slabs 18, 19 and 20 so that the wings 28—28 are to the rear of the slab 20, a 90 degree rotation of the telephone cord 14 and the ferrule 27 will bring the wings 28—28 in register with the passageways 32 and 33 in the slab 20. A backward pull applied then to the telephone cord 14 will bring the wings 28—28 through the passageways 32 and 33 and against the rear face of the slab 19. In this position the telephone cord 14 cannot be withdrawn from the terminal block since the wings 28—28 of the ferrule 27 are against the rear face of the slab 19. Also, further rotation of the telephone cord 14 and the ferrule 27 cannot take place because the wings 28—28 are in the passageways 32 and 33. In order to hold the wings 28—28 in this position a bifurcated stop member 38 shown in Figs. 5 and 6 is provided on the rear face of the slab 20. The stop member 38 is adjustably secured in place by means of a screw 39 which passes through an aperture in the stop member 38 and into screw threaded engagement with an internally threaded eyelet not shown but which is of the same structure as the terminals 22 and is mounted in aligned apertures 40 in the slabs 19 and 20. The leg portions 41 and 42 of the stop member 38 are spaced a sufficient distance apart to accommodate the cylindrical portion of the ferrule 27 and are arranged to extend respectively over the passageways 32 and 33 of the slab 20 and to lie in flat face-to-face engagement with the rear face of the slab 20 when the screw 39 is tightened, the closed end of the stop member 38 being given an offset bend at 43 to accommodate the underlying spun-over end of the eyelet on which the stop member 38 is supported by means of the screw 39. It will be seen by looking at Figs. 5 and 6 that when the screw 39 is tightened the wings 28 of the ferrule 27 are locked in the passageways 32 and 33. Release from this position may be accomplished by loosening the screw 39 and by applying a forward thrust to the telephone cord 14 until the wings 28 are clear of the rear face of the slab 20. The telephone cord 14 may then be rotated 90 degrees to bring the wings 28 into line with the finger-like extensions 29 of the apertures 26. In this position if a sufficient backward pull is applied to the telephone cord 14 the ferrule 27 will be withdrawn from the terminal block 1.

Each conductor 15 in the telephone cord 14 is equipped with a terminal 44 as shown in Fig. 3. The terminal 44 is of a well-known type in which a tubular portion 45 is clamped about an end of the insulated conductor 15 and an end portion of the terminal 44 is made adaptable to receive one of the terminal screws 24, electrical connection of the conductor wire to the terminal 44 being attained by pressing a portion of the tubular portion 45 through the insulating covering of the wire and into contact with the conductor. The tubular portion 45 of the terminal 44 does not lie altogether in the same plane as the portion to be inserted under the head of the screw 24 since the portion to be thus inserted is made substantially flat and the tubular portion 45 is round. The slab 20 is particularly well designed to accommodate terminals 44 of the type above mentioned since the apertures 30 and 31 and the finger-like extensions 34 thereof will readily receive the tubular portions 45 of the terminals 44 brought to the terminal block. When the terminal 44 is brought into electrical connection with a terminal 22 on the terminal block 1 and the screw 24 is tightened to press the flat portion of the telephone cord terminal against a spun-over end of the terminal 22, the tubular portion 45 of the terminal 44 is pressed into the corresponding finger-like extension 34 in the slab 20. When the tubular portion 45 of the terminal 44 is in this position the terminal 44 cannot be rotated in such manner as to cause loosening of the screw 24 or contacting of the tubular portion 45 of one terminal 44 with the tubular portion 45 of another. Each wire 15 of the telephone cord 14 is brought into electrical connection with a terminal 22 on the terminal block 1, the wires being loosely arranged within the interior of the outlet box 8, as shown in Fig. 2, and being held in electrical connection with the terminals 22 by means of the screws 24 which pass through the terminals 44 and into the terminals 22. The wires 6 of the telephone line 5 are also loosely arranged within the outlet box 8 and are brought into electrical connection with the terminals of the telephone cord 14 by placing bared ends of the wires 6 under the heads of the screws 24 and by tightening the screws 24 in the terminals 22. In connecting the wires 6 to the terminals on the terminal block 1 sufficient slack is left in the wires 6 to permit connecting of the wires when the terminal block 1 is detached from the outlet box 8 as shown in Fig. 3. After all required electrical connections have been made between the wires 6 and the wires 15 with the parts in the condition shown in Fig. 3, the terminal block 1 is placed in the position shown in Fig. 2, the slack portions of the wires being pressed back within the outlet box 8. The terminal block 1 is secured to the outlet box 8 by means of screws 46 which extend through apertures 47 in the face plate 16 and into internally threaded ears 48 on the outlet box 8. In Fig. 2 the face plate 16 is clamped against the outer face of an apertured base-board 2 of a building wall 3 and covers the aperture in the base-board, the outlet box 8 is located to the rear of the base-board 2 and is let into the aperture 11 in the building wall 3, the open end of the outlet box being flush with the plane of the rear surface of the base-board 2. In the event, however, that the base-board 2 were not provided or the outlet box 8 should be located in a portion of the building wall not covered by the base-board 2, the screws 46 would be tightened down within the ears 48 to bring the face plate 16 across the aperture 11 in the building wall 3 and directly across the open end of the outlet box 8.

The slab 17 comprising the slabs 18, 19 and 20 forms in effect a single slab of insulating material with an indentation formed in the rear surface, the indentation being provided by the apertures 26, 30 and 31, and the passageways 32 and 33 in the slab 20.

In the interest of economy in manufacture it may be found desirable to make the slab 17 in the form of a one-piece slab 49 as shown in Fig. 7, the slab 49 having an indentation 50 in the rear face, and with the indentation 50 taking the form of the apertures 26, 30, 31 and the passageways 32 and 33 found in the slab 20 shown in Fig. 4. In this case as shown in Fig. 7 suitable terminals 51 adapted to receive the screws 24 are molded in or otherwise embedded in the slab 49. The slab 49 is apertured at 36—36 to receive the rivets 37—37 shown in Fig. 5, so that the slab 49 may be secured by the rivets 37—37 to the face plate 16. The slab 49 is apertured at 26 to accommodate the telephone cord 14 and the ferrule 27 and has the passageways 32 and 33 to receive the wings 28 of the ferrule, the passageways 32 and 33 being part of the indentation 50. A stop member 38 to hold the wings 28 of the ferrule in the passageways 32—33 would be mounted on the slab 49 by means of the screw 39.

In the interest of further economy in manufacture it may be found desirable to make the face plate 16 shown in Figs. 2, 3, 4 and 5 and the slab 49 shown in Fig. 7 all in one piece. This modification is shown in Fig. 8. In this case the terminal block 52 comprises a face plate portion 53 and an integral slab portion 54. The slab portion 54 extends from the rear of the face plate portion 53 and has an indentation 55 formed in its rear face of the same form as the indentation 50 shown in Fig. 7. Terminals 22 are supported in the slab portion 54. The terminal block 52 is apertured at 26 to receive the telephone cord 14 and the ferrule 27 and is apertured at 47 to accommodate the mounting screws 46 shown in Fig. 2. A stop member 38 having the leg portions 41 and 42 is secured to the rear face of the slab portion 54.

Because of space limitations the terminal block structures above described can accommodate only a relatively small number of wires. The capacity of the terminal block may be increased, however, as shown in Fig. 9 by providing more than one slab on a single face plate member and equipping each slab with a plurality of terminals. The terminal block 56 shown in Fig. 9 follows the general structure of the terminal blocks shown in the other figures in the drawings but is provided with a second slab member 57. It will be assumed merely for the purpose of simplification in the description and not in the sense of a limitation in structure that the terminal block 56 comprises the terminal block shown in Figs. 2, 3, 4 and 5 comprising the face plate 16 and the slab 17. The second slab member 57 is mounted to the rear of the slab 17 on spaced posts 58—58, held in place by screws 59 extending through the face plate 16, the slab 17 and into the posts 58. The slab 57 may be supported on the rear end portions of the posts 58 by means of mounting screws 60, and may comprise the slabs 19 and 20 shown in Fig. 4 or the slab 49 shown in Fig. 7. The slab 57 is equipped with the terminals 22 in the same manner as the slab 17. Some of the wires 15 of the telephone cord 14 are led to the terminals 22 on the slab 17 and others are led through the aperture 26 in the slab 57 for connection to the terminals 22 on the slab 57. The ferrule 27 is held by means of the stop member 38 so that the wings 28 are in the passageways 32—33 in the slab 17. The terminal block 56 may obviously be used in the same manner as the terminal block 1 but will take care of a larger number of wires.

What is claimed is:

1. A terminal block adapted to be placed over an open end of a wire outlet receptacle in a building wall and comprising in combination an apertured face plate to cover an open end of the receptacle, an apertured slab of insulating material on the rear of said face plate, an indentation formed in the rear face of said slab, said indentation extending in the form of two narrow passageways from the aperture in said slab and then widening out in hand-like form on opposite sides of the aperture in the slab, terminals supported in spaced relation on said slab, finger-like extensions of said indentation extending toward said terminals and a bifurcated stop member supported on said slab and having leg portions extending over said passageways.

2. A terminal block comprising an apertured slab of insulating material, an apertured face plate on the front of said slab, an indentation formed in the rear face of said slab, said indentation being in the form of two hands connected by passageways to the aperture in said slab, terminals supported in spaced relation on said slab, finger-like extensions of said indentation extending toward said terminals, a second slab of insulating material supported in spaced relation to the rear of said first-mentioned slab and formed like the first-mentioned slab and means holding said slabs in spaced relation.

ROY V. TERRY.